United States Patent
Russo et al.

(10) Patent No.: US 12,400,022 B2
(45) Date of Patent: Aug. 26, 2025

(54) ESTIMATING ACCURACY OF PRIVACY-PRESERVING DATA ANALYSES

(71) Applicant: DPella AB, Gothenburg (SE)

(72) Inventors: Alejandro Russo, Gothenburg (SE); Marco Gaboardi, Brookline, MA (US); Elisabet Lobo-Vesga, Mölndal (SE)

(73) Assignee: DPELLA AB, Gothenburg (SE)

( * ) Notice: Subject to any disclaimer, the term of this patent is extended or adjusted under 35 U.S.C. 154(b) by 151 days.

(21) Appl. No.: 17/923,441

(22) PCT Filed: Apr. 28, 2021

(86) PCT No.: PCT/SE2021/050387
§ 371 (c)(1),
(2) Date: Nov. 15, 2022

(87) PCT Pub. No.: WO2021/225496
PCT Pub. Date: Nov. 11, 2021

(65) Prior Publication Data
US 2023/0205916 A1    Jun. 29, 2023

(30) Foreign Application Priority Data
May 7, 2020 (SE) .................................. 2050534-3

(51) Int. Cl.
*G06F 21/62* (2013.01)
*G06F 16/2455* (2019.01)
*G06F 17/18* (2006.01)

(52) U.S. Cl.
CPC .... *G06F 21/6245* (2013.01); *G06F 16/24556* (2019.01)

(58) Field of Classification Search
CPC . G06F 21/6245; G06F 16/24556; G06F 17/18
See application file for complete search history.

(56) References Cited

U.S. PATENT DOCUMENTS

| | | | | |
|---|---|---|---|---|
| 2012/0143922 A1* | 6/2012 | Rane | ................... | G06F 21/6245 |
| | | | | 707/E17.005 |
| 2013/0212690 A1* | 8/2013 | Fawaz | .................... | G06F 21/60 |
| | | | | 726/26 |

(Continued)

FOREIGN PATENT DOCUMENTS

WO    WO-2015/026386 A1    2/2015

OTHER PUBLICATIONS

International Search Report and Written Opinion, International Application No. PCT/SE2021/050387, dated Jul. 28, 2021.

(Continued)

*Primary Examiner* — Shirley X Zhang
(74) *Attorney, Agent, or Firm* — Sage Patent Group

(57) ABSTRACT

Systems and methods for estimating the accuracy, in the form of confidence intervals, of data released under Differential Privacy (DP) mechanisms and their aggregation. Reasoning about the accuracy of aggregated released data can be improved by combining the use of probabilistic bounds like union and Chernoff bounds. Some probabilistic bounds, e.g., Chernoff bounds, rely on detecting statistical independence of random variables, which in this case corresponds to sources of statistical noise of DP mechanisms. To detect such independence, and provide accuracy calculations, provenance of statistical noise sources as well as information flows of random variables are tracked within data analyses, i.e., where, within data analyses, randomly generated statistical noise propagates and how it gets manipulated.

13 Claims, 6 Drawing Sheets

(56) References Cited

U.S. PATENT DOCUMENTS

| | | | |
|---|---|---|---|
| 2013/0275743 A1* | 10/2013 | Jawurek | H04L 9/008 |
| | | | 713/150 |
| 2016/0300252 A1* | 10/2016 | Frank | G06F 21/6245 |
| 2017/0329873 A1* | 11/2017 | Eide | G06F 21/6254 |
| 2018/0189164 A1* | 7/2018 | Kulkarni | G06F 21/6245 |
| 2020/0327252 A1* | 10/2020 | Mcfall | G06F 21/78 |
| 2021/0073677 A1* | 3/2021 | Peterson | G06N 20/00 |
| 2021/0281483 A1* | 9/2021 | Malpani | H04K 1/02 |
| 2021/0336938 A1* | 10/2021 | Karabatis | H04L 63/1475 |
| 2022/0138348 A1* | 5/2022 | Bernau | G06F 21/6254 |
| | | | 726/26 |

OTHER PUBLICATIONS

Lobo-Vesga et al., "A Programming Framework for Differential Privacy with Accuracy Concentration Bounds," (2019). Retrieved from the Internet: URL: https://arxiv.org/abs/1909.07918> [retrieved on May 5, 2020].

Boncz et al., "APEx : Accuracy-Aware Differentially Private Data Exploration," (2019). Retrieved from the Internet: URL: https://arxiv.org/pdf/1712.10266.pdf [retrieved on Jul. 19, 2021].

* cited by examiner

ESTIMATING ACCURACY OF PRIVACY-PRESERVING DATA ANALYSES

TECHNICAL FIELD OF THE INVENTION

The present invention relates to accuracy estimations of data analyses and in particular to data analyses involving differential privacy mechanisms.

BACKGROUND OF THE INVENTION

Large amounts of data are being collected about subjects (individuals) by a variety of organizations like research institutions or companies. However, much of the collected data is private: it comprises details about subjects and their behavior. Privacy concerns about subjects restrict the way this information can be used and released, where utilizing subjects' data is therefore curbed for ethical, legal, or business reasons. It is often believed that data can be anonymized somehow in order to preserve the privacy of individuals. While a step forward, simply anonymizing data loses their effectiveness when additional knowledge can be exploited.

Differential privacy (DP) mechanism enables to perform data analyses to release statistical information about the population without compromising data subjects' privacy. A standard way to comply with the DP definition is adding (carefully calibrated) statistical noise into the results of data analyses. By doing that, DP protects privacy, while enabling the use of confidence intervals to express requirements of the accuracy of released data. Accuracy requirements are not baked in the definition of DP, rather it is a constraint that is made explicit for a specific task at hand when DP data analyses are designed. Accuracy is provided through estimates given as confidence intervals, or error bounds.

The complex nature of confidence intervals makes it hard to reason about the accuracy of data analyses which aggregate released data as part of its function. Union bound, a probabilistic bound which used no assumption on the way the statistical noise is generated, provide a tool to estimate accuracy of aggregated released data. However, such estimations are often very conservative when the number of released data to aggregate increases—which renders useless any accuracy estimation. Most existing software artifacts implementing DP mechanisms with accuracy as confidence intervals do not support to reason about the accuracy of aggregated released data.

BRIEF SUMMARY OF THE INVENTION

It is an object to obviate at least some of the above disadvantages and provide improved systems and methods for obtaining accuracy estimations for data analyses with aggregated released data. It shows how to incorporate probabilistic concentration bounds which require to determine statistical independence of the generated statistical noise like Chernoff bound—a probabilistic bound which provides very often smaller confidence interval than union bound. To detect statistical independence, the invention describes methods for tracking the provenance of noise generation in data analyses as well as how released data and their aggregations propagate within them.

This is provided in a number of embodiments, such as a method for providing one or several accuracy estimations of a data analysis using differential privacy, DP, mechanisms. The method comprises a number of steps for operating different functions: receiving information about a data set to be analyzed, information about the data analysis, and receiving at least one scenario parameter set related to the data analysis. Depending on scenario to be determine the accuracy for, the scenario parameter set may comprise one of: a DP-parameter set ($\varepsilon$, $\delta$) for a given mechanism together with a wanted confidence parameter for accuracy calculations; or a wanted confidence parameter $\beta$ and confidence interval. The electronic device applies taint analysis using the information about the data set and in the taint analysis attaching provenance tags to the generation of noise values, wherein the tags comprise: an identifier indicating a distribution from where statistical noise will be sampled by the DP mechanism; a parametrization of the distribution; and identifiers denoting a statistical dependency on other noisy values. Computing the provenance tags, for the result of aggregating noisy values, based on the provenance tags attached to the noisy values received by an aggregation operation as well as the aggregation operation itself. Estimating accuracy as a narrowest confidence interval provided by concentration bounds when provenance tags indicate statistical independence among noisy values and determining a scenario response in relation to the received scenario parameter set.

The scenario response is then provided, wherein the scenario response is one of: the accuracy estimation as confidence interval ($-\alpha$, $\alpha$) for the data analysis; or a DP-parameter to be used by the received data analysis in order to achieve a wanted accuracy with the received confidence parameter $\beta$ and received confidence interval.

The method may further comprise deciding which concentration bounds are applicable from at least one of union and Chernoff bounds. The use of both union and Chernoff bounds provides an advantage to compute the narrowest confidence interval depending on the situation where the aggregation of data occurs.

Computing provenance tags, when noisy values are aggregated, may comprise at least one of sum, scalar multiplication, and negation of noisy values.

The method further comprising computing provenance tags when calculating $\ell_\infty, \ell_2, \ell_1$ norms based on noisy values.

The information about the data analysis may comprise at least one of structure of data set, data-set, query to run, or differential privacy parameter. Allowing for accuracy calculations of different scenarios to be provided.

The step of determining when tags indicate statistical independence may comprise inspecting for all tags the identifier indicating a distribution from where statistical noise will be sampled by the DP mechanism and the identifier denoting a statistical dependency on other noisy values.

The differential privacy, DP, mechanism may be at least one of Laplace and/or Gaussian mechanisms further widening the application of the solution.

The electronic device may receive information about the data analysis from a remote device via a digital communications network and providing the scenario response via the digital communications network. This provides an advantage of providing accuracy estimations remotely. This has a further advantage of providing the accuracy estimations as a service to remote parties.

The method may further comprise steps of injecting noise into a result of a data analysis according to a chosen DP-mechanism and providing the result with injected noise.

In another aspect of the present invention, an electronic device may be provided for providing accuracy estimations, the electronic device comprising one or more processors, at least one memory storing one or more programs configured to be executed by the one or more processors, the one or more programs including instructions for performing the method.

Furthermore, in yet another aspect of the invention, a computer-readable storage medium may be provided for storing one or more programs configured to be executed by one or more processors of an electronic device, the one or more programs including instructions for performing the method.

The solution as defined in the claims provide an efficient way of providing reliable accuracy estimations on data structures, data analyses, and/or data sets. The solution provide a flexible way of determining the narrowest confidence interval for a given query. Having an efficient solution decreases the computational burden and power needs for the electronic device handling the accuracy estimations. Furthermore, providing a reliable accuracy estimation increases the efficiency in performing data analyses and increases the confidence in interpreting results from data analyses.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF THE DRAWINGS

Figure 1:
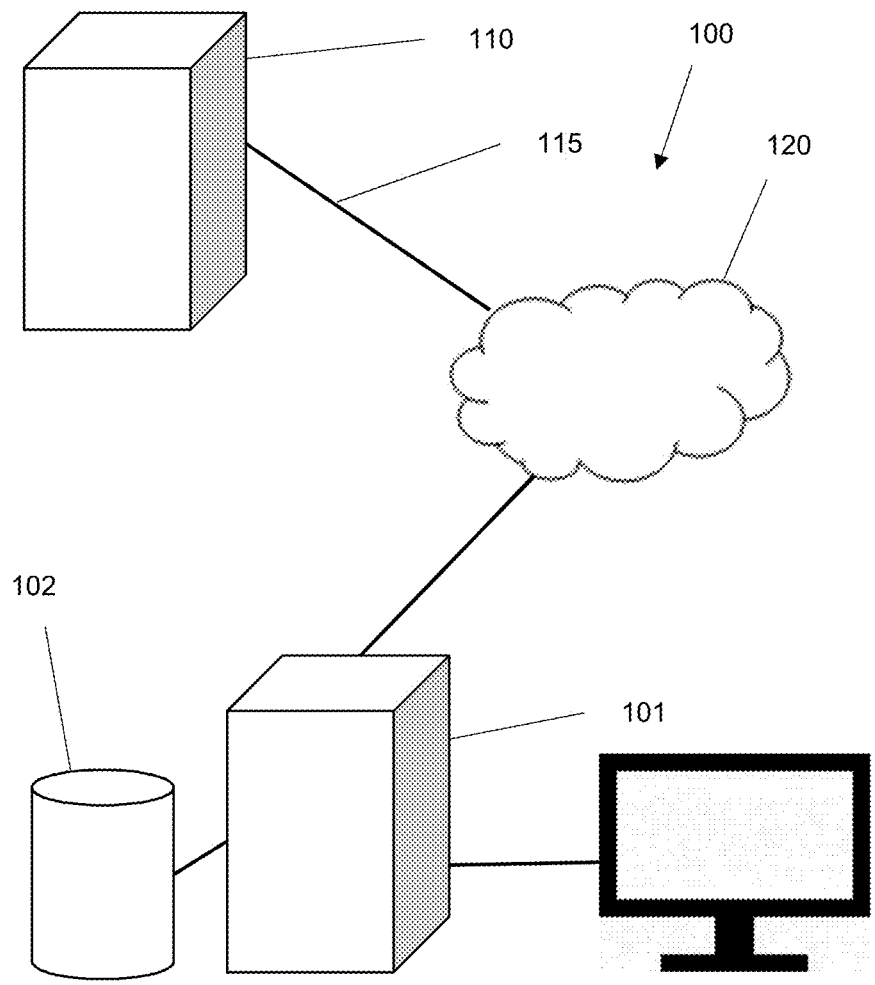
FIG. 1 is a schematic block diagram illustrating an example system.

In FIG. 1 reference numeral 100 generally denotes a system for determining and providing an estimation of accuracy of a statistical data analysis to be performed. The system comprise an electronic device 101 arranged to perform calculations and operate data analyses on data sets and/or accuracy estimations of data analyses and on data sets and data structures. Data analyses may for instance be statistical analyses and machine learning analyses but other types of analyses incorporating differential privacy mechanisms may be performed as well. The electronic device is optionally connected to a display 102 for interacting with a user and displaying settings and results from provided functionality. The electronic device 101 may be arranged to receive information about data analyses to be performed, information about data sets, data sets, data structure information, or parameters relating to data analyses from a remote query device 110 communicating with the electronic device via a digital communications network 120 and network communication lines 115. Furthermore, the electronic device may be arranged to transmit results to the remote device in the same manner. It should be noted that the electronic device may receive data sets, data analyses, and/or data structure information using other means, such as using portable memory modules such as universal storage bus modules or similar. The network communication may be based on Ethernet or other communication protocols using wired or wireless technologies as physical transmission media. Using a communications interface the electronic device may receive relevant information for performing accuracy estimations according to the present solution from remote devices and can optionally provide the accuracy estimations as a service to different entities and the remote entities may perform the actual (statistical) data analyses. However, the electronic device may also be arranged to perform the data analyses together with the accuracy estimations and thus providing a complete analysis package.

Figure 2:
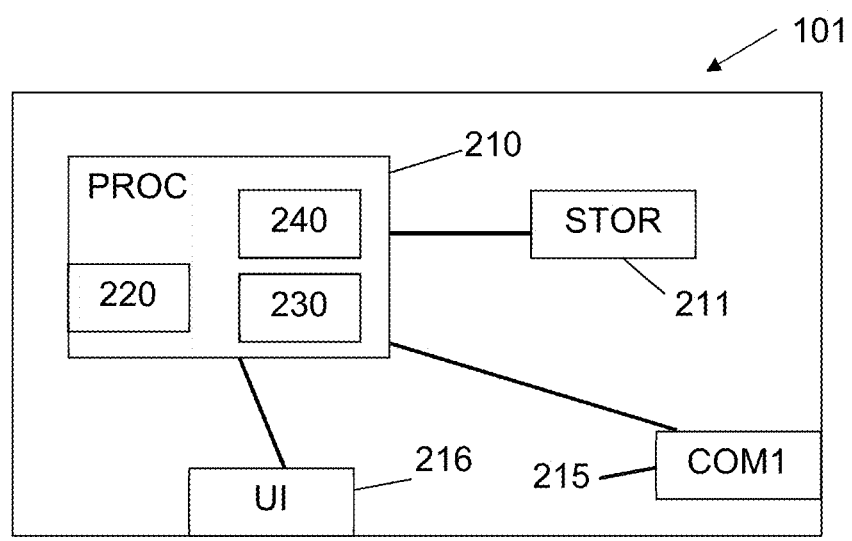
FIG. 2 is a schematic block diagram illustrating an exemplary device.

As can be seen in FIG. 2, the electronic device 101 comprises one or more processors or processing units 210, one or more memory 211 for storing data and/or instruction sets for operating functionality, at least one communication interface 215, and optionally a user interface (UI) 216 interface. The processing unit comprises one or several modules for operating different types of functionality, such as an instruction set operation module 220 arranged to operate calculations and other functionality of the processing unit and a communication module 230 for handling receiving and transmitting data via the digital communications network 120. Furthermore, the processing unit 210 may comprise a user interface module for handling user interface functionality such as displaying data and functionality on a display 102 and/or receiving user instructions from a keyboard, mouse or other user interface devices (not shown).

The one or more processors 210 may comprise any suitable processor or combination of processors arranged to operate instruction sets for operating software functions. For example, the processing unit may be a central processing unit (CPU), microprocessor, digital signal processor (DSP), a graphical processing unit (GPU), a field programmable gate array (FPGA), application specific integrated circuit (ASIC), or any other similar device arranged to operate processing functionality and calculations.

Memory 211 of electronic device 101 can include one or more non-transitory computer-readable storage mediums, for storing computer-executable instructions, which, when executed by one or more computer processors 210, for example, can cause the computer processors to perform the techniques described below. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. The computer-readable storage medium stores one or more programs configured to be executed by the one or more processors of an electronic device, the one or more programs including instructions or instruction sets for performing functions and methods as described in this document.

The electronic device 101 is arranged to operate instruction sets and functionality for operating data analyses and accuracy estimation methods as will be described below.

Differential privacy (DP) is a quantitative notion of privacy that bounds how much a single individual's private data can affect the result of a data analysis. Formally, differential privacy is a property of a randomized query $\tilde{Q}(\bullet)$ representing the data analysis, as follow.

Definition (Differential Privacy)

A randomized query $\tilde{Q}(\bullet):db \to \mathbb{R}$ satisfies $(\varepsilon, \delta)$-differential privacy if and only if for any two datasets $D_1$ and $D_2$ in db, which differ in one row, and for every output set $S \subseteq \mathbb{R}$, it holds that $Pr[\tilde{Q}(D_1) \in S] \leq e^\varepsilon \cdot Pr[\tilde{Q}(D_2) \in S] + \delta$.

In the definition above, the parameters $(\varepsilon, \delta)$ determines a bound on the distance between the distributions induced by $\tilde{Q}(\bullet)$ when adding or removing an individual from the dataset.

When the parameter $\delta=0$, the definition above is referred as pure-DP, while when $\delta>0$ is called approximated-DP.

To protect all the different ways in which an individual's data can affect the result of a query, the noise needs to be calibrated to the maximal change that the result of the query can have when changing an individual's data. This is formalized through the notion of sensitivity.

Definition (Sensitivity)

The (global) sensitivity of a query $Q:db \to \mathbb{R}$ is the quantity $\Delta_Q = \max\{|Q(D_1)-Q(D_2)|\}$ for $D_1$, $D_2$ differing in one row.

A standard way to achieve DP is adding some carefully calibrated noise to the result of a query, where it is also important the choice of the kind of noise that one adds. A standard approach to achieve pure-DP is based on the addition of noise sampled from the Laplace distribution.

Theorem (Laplace Mechanism)

Let $Q:db \to \mathbb{R}$ be a deterministic query with sensitivity $\Delta_Q$. Let $\tilde{Q}(\bullet):db \to \mathbb{R}$ be a randomized query defined as $\tilde{Q}(D)=Q(D)+\eta$, where $\eta$ is sample from the Laplace distribution with mean $\mu=0$ and scale $$b = \frac{\Delta_Q}{\varepsilon}.$$

Then, $\tilde{Q}(\bullet)$ is $(\varepsilon, 0)$-differentially private, or simply $\varepsilon$-differentialy private.

A standard approach to achieve approximated-DP is based on the addition of noise sampled from the Gaussian distribution.

Theorem (Guassian Mechanism)

Let $Q:db \to \mathbb{R}$ be a deterministic query with sensitivity $\Delta_Q$. Let $\varepsilon$ and $\delta$ be values in the interval (0,1). Let $\tilde{Q}(\bullet):db \to \mathbb{R}$ be a randomized query defined as $\tilde{Q}(D)=Q(D)+\eta$, where $\eta$ is sample from the Gaussian distribution with mean $\mu=0$ and standard deviation $$\sigma = \Delta_Q \cdot \frac{\sqrt{2 \cdot \log\left(\frac{1.25}{\delta}\right)}}{\varepsilon}.$$

Then, $\tilde{Q}(\bullet)$ is $(\varepsilon, \delta)$-differentialy private. In general, the notion of accuracy using confidence intervals can be defined as follows.

Definition (Accuracy)

Given a $(\varepsilon, \delta)$-differentialy private query $\tilde{Q}(\bullet)$, a target deterministic query $Q(\bullet)$, a distance function $d(\bullet)$, a bound $\alpha$, and the probability $\beta$, $\tilde{Q}(\bullet)$ is $(d(\bullet), \alpha, \beta)$-accurate with respect to $Q(\bullet)$ if and only if for all dataset D, it holds that $Pr[d(\tilde{Q}(D), Q(D)) > \alpha] \leq \beta$.

This definition allows one to express data independent error statements such as: with probability at least $1-\beta$ the result of query $\tilde{Q}(D)$ diverges from the result of Q(D), in terms of the distance $d(\bullet)$, for less than $\alpha$. Then, we will refer to $\alpha$ as the error, $\beta$ as the confidence probability, and $(-\alpha, \alpha)$ as the confidence interval. For the rest of the document, the considered distance function is that on real numbers: $d(x,y) = |x-y|$. There are known results about the accuracy for queries using the Laplace and Gaussian Mechanisms.

Definition (Accuracy for the Laplace Mechanism)

Given a $\varepsilon$-differentialy private query $\tilde{Q}(\bullet):db \to \mathbb{R}$ implemented with the Laplace Mechanism, it holds that $$Pr\left[|\tilde{Q}(D) - Q(D)| > \log\left(\frac{1}{\beta}\right) \cdot \frac{\Delta_Q}{\varepsilon}\right] \leq \beta.$$

Definition (Accuracy for the Gaussian Mechanism)

Given a $(\varepsilon, \delta)$-differentialy private query $\tilde{Q}(\bullet):db \to \mathbb{R}$ implemented with the Gaussian Mechanism, it holds that $$Pr\left[|\tilde{Q}(D) - Q(D)| > \sigma \cdot \sqrt{2 \cdot \log\left(\frac{2}{\beta}\right)}\right] \leq \beta.$$

There are two known concentration bounds for random variables which are useful to reason about the aggregation of released data.

Definition (Union Bound)

Given $n \geq 2$ random variables $V_j$ with their respective inverse cumulative distribution function $iCDF_j$, where $j=1, \ldots, n$ and $$\alpha_j = iCDF_j\left(\frac{\beta}{n}\right),$$

then the addition $Z = \Sigma_{j=1}^n V_j$ has the following accuracy: $Pr[|Z| > \Sigma_{j=1}^n \alpha_j] \leq \beta$.

Union bound makes no assumption about the distribution of the random variables $V_j$, $j=1, \ldots, n$. In contrast Chernoff bound often provides a tighter error estimation than the commonly used union bound when adding several statistically independent random variables.

Definition (Chernoff Bound for Laplace Distributions)

Given $n \geq 2$ random variables $V_j$ which distribution is Laplace with mean $\mu=0$ and scale $b_j$, where $j=1, \ldots, n$, $b_M = \max\{s_j\}_{j=1, \ldots, n}$, and $$v > \max\left\{\sqrt{\Sigma_{j=1}^n s_j^2}, b_M \cdot \sqrt{\log\left(\frac{2}{\beta}\right)}\right\},$$

then the addition $Z = \Sigma_{j=1}^n V_j$ has the following accuracy:

$$Pr\left[|Z| > v \cdot \sqrt{8 \cdot \log\left(\frac{2}{\beta}\right)}\right] \leq \beta.$$

Definition (Chernoff Bound for Gaussian Distributions)

Given $n \geq 2$ random variables $V_j$ which distribution is Gaussian with mean $\mu=0$ and standard deviation $\sigma_j$ where $j=1, \ldots, n$, then the addition $Z = \Sigma_{j=1}^n V_j$ has the following accuracy:

$$Pr\left[|Z| > \sqrt{2 \cdot \sum_{j=1}^{n} \sigma_j^2 \cdot \log\left(\frac{1}{\beta}\right)}\right] \le \beta.$$

Figure 3:
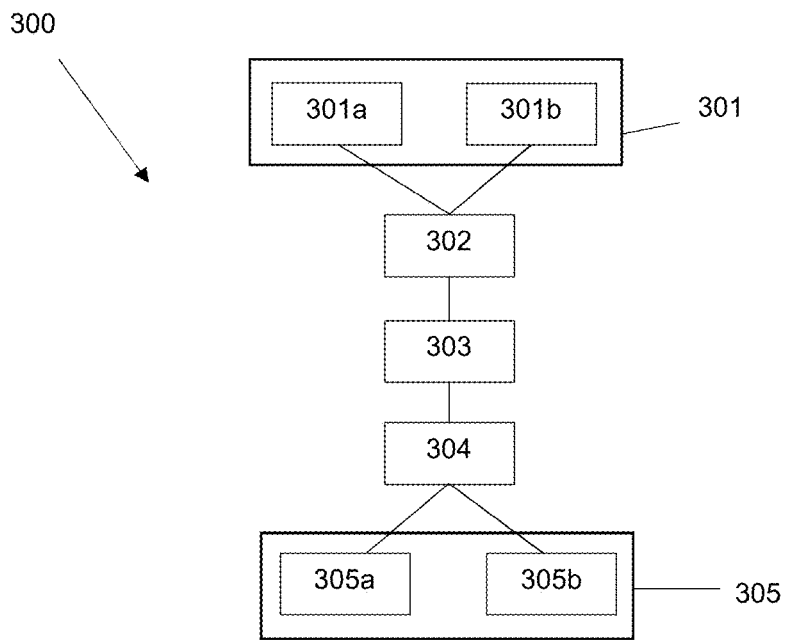
FIG. 3 is a schematic block diagram illustrating an exemplary method.

FIG. 3 illustrates an overall view of a method 300 for error estimations for a data analysis for scenarios where (i) DP-parameters are given and accuracy needs to be provided and (ii) where a wanted accuracy is given and DP-parameters are provided. For these two scenarios, we also consider a possibility to inject noise according to a contemplated DP-parameters and provide a noisy result.

An exemplary method 300 according to the present solution will now be discussed in relation to FIG. 3. The method is performed in an electronic device as discussed previously in this document. The method provides one or several accuracy estimations of a data analysis using differential privacy, DP, mechanisms. The method comprises a number of steps for operating different functions:

In a first step, the electronic device receives 301 information about a data set to be analyzed, information about the data analysis, and receiving at least one scenario parameter set related to the data analysis. Depending on scenario to be determine the accuracy for, the scenario parameter set may comprise one of:

301*a*) a DP-parameter set (ε, δ) for a given mechanism together with a wanted confidence parameter for accuracy calculations; or

301*b*) a wanted confidence parameter β and confidence interval.

In a next step, the electronic device applies 302 taint analysis using the information about the data set and in the taint analysis attaching provenance tags to the generation of noise values, wherein the tags comprise:

a) an identifier indicating a distribution from where statistical noise will be sampled by the DP mechanism;

b) a parametrization of the distribution; and c) identifiers denoting a statistical dependency on other noisy values.

The electronic device computes 303 the provenance tags, for the result of aggregating noisy values, based on the provenance tags attached to the noisy values received by an aggregation operation as well as the aggregation operation itself.

The electronic device then estimates 304 accuracy as a narrowest confidence interval provided by concentration bounds when provenance tags indicate statistical independence among noisy values and determining a scenario response in relation to the received scenario parameter set.

The scenario response is provided 305, wherein the scenario response is one of:

305*a*) the accuracy estimation as confidence interval (−α, α) for the data analysis; or

305*b*) a DP-parameter to be used by the received data analysis in order to achieve a wanted accuracy with the received confidence parameter β and received confidence interval (305*b*).

The scenario response is provided either internally or to an external device.

The method may further comprise deciding which concentration bounds are applicable from at least one of union and Chernoff bounds.

Computing provenance tags, for when noisy values are aggregated, may comprise at least one of sum, scalar multiplication, and negation of noisy values.

The method further comprising computing provenance tags when calculating $\ell_\infty, \ell_2, \ell_1$ norms based on noisy values.

The information about the data analysis may comprise at least one of structure of data set, data-set, query to run, or differential privacy parameter.

The step of determining when tags indicate statistical independence may comprise inspecting for all tags the identifier indicating a distribution from where statistical noise will be sampled by the DP mechanism and the identifier denoting a statistical dependency on other noisy values.

The differential privacy, DP, mechanism may be at least one of Laplace and/or Gaussian mechanisms.

The electronic device may receive information about the data analysis from a remote device via a digital communications network and providing the scenario response via the digital communications network to the remote device or some other entity.

The method may further comprise steps of injecting noise into a result of a data analysis according to a chosen DP-mechanism and providing the result with injected noise.

The different functional parts will now be discussed in more detail below.

The solution provides a static analysis capable to compute the accuracy of DP data analyses which aggregate released data. From now on, released data and any aggregation of it is referred as noisy data or noisy value. The accuracy analysis does not execute the DP analysis but rather inspects its components and sub-components looking for where noisy data is generated and aggregated. The solution follows the principle of improving accuracy calculations by detecting statistical independence. For that, it applies a taint analysis which, for each noisy value, tracks (i) information about the distribution used for noise generation, (ii) the parametrization of the distribution, and (iii) identifiers denoting statistical dependence of other noise sources. The taint analysis uses provenance tags—comprising (i), (ii), and (iii)—which are associated with noisy values and propagated along the different operations found in the considered data analysis. Based on such tags, the solution may use inverse Cumulative Distribution Function (iCDF), which given a 0≤β≤1, it returns the corresponding (theoretical) confidence interval. For instance, if function f is an iCDF, and f(0.05)=7, it indicates that the released (noisy) data by a given DP mechanism is no more than distance 7 from the no noisy version of the release data with confidence of 95%—the confidence in percentage is calculated as (1−β)*100.

In order to perform the accuracy calculations, the solution scrutinizes the operations which constitute a data analysis and proceeds to perform error calculations on them based on the following cases: A) where noisy data is generated, B) how such noisy data gets subsequently aggregated, C) negated, and D) scaled; and if the analysis calculates E) norms.

Figure 4:
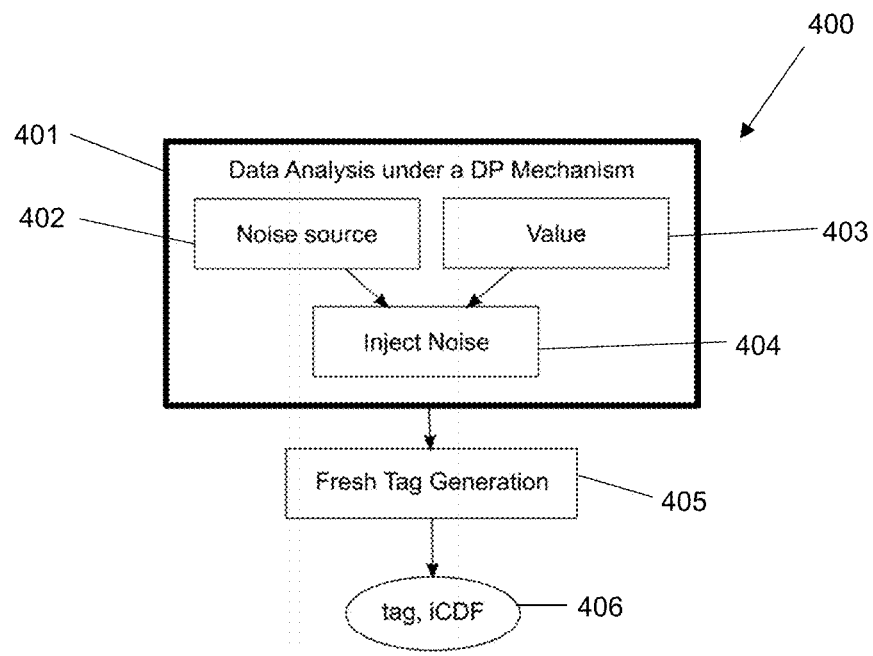
FIG. 4 is a schematic block diagram illustrating an exemplary method.

A. Released data: For each component of the data analysis where the underlying DP mechanism will inject 404 noise (using a noise source 402) to a value produced by the data analysis 403, the accuracy analysis generates accuracy information comprising a freshly generated 405 provenance tag and a corresponding iCDF based on the privacy parameters (ε, δ) of the underlying DP mechanism—see FIG. 4 illustrating a data analysis 400 under a DP mechanism and which returns 406 the provenance tag and corresponding iCDF. The tag is a set which comprises a 3-tuple with the following components:

i. an identifier indicating the distribution of the statistical noise used by the underlying DP mechanism;
ii. a parametrization of such distribution; and
iii. a freshly generated identifier Below, the tag and iCDF are instantiated for the Laplace and Gaussian mechanisms.

For a data analysis $\tilde{Q}(\bullet):db \to \mathbb{R}$ using the Laplace Mechanism with privacy parameter $\varepsilon$ and sensitivity $\Delta_Q$:

$$\text{tag} = \left\{ \left( L, \frac{\Delta_Q}{\varepsilon}, \{p\} \right) \right\},$$

where L indicates that statistical noise is drawn from the Laplace distribution with location parameter $\mu=0$ and scale parameter $$b = \frac{\Delta_Q}{\varepsilon},$$

and the singleton set $\{p\}$ comprises a freshly generated identifier p.

$$iCDF(\beta) = \log\left(\frac{1}{\beta}\right) \cdot \frac{\Delta_Q}{\varepsilon},$$

which indicates that the confidence interval for a given $\beta$ is characterized by $$\alpha = \log\left(\frac{1}{\beta}\right) \cdot \frac{\Delta_Q}{\varepsilon}.$$

For a data analysis $\tilde{Q}(\bullet):db \to \mathbb{R}$ using the Gauss Mechanism with privacy parameter $\varepsilon$, $\delta$ and sensitivity $\Delta_Q$:
tag=$\{(G, \sigma^2, \{p\})\}$, where G indicates that statistical noise is drawn from the Gauss distribution with mean $\mu=0$ and standard deviation $$\sigma = \Delta_Q \cdot \frac{\sqrt{2 \cdot \log\left(\frac{1.25}{\delta}\right)}}{\varepsilon}$$

and the singleton set $\{p\}$ comprises a freshly generated identifier p.

$$iCDF(\beta) = \sigma \cdot \sqrt{2 \cdot \log\left(\frac{2}{\beta}\right)}$$

which indicates that the confidence interval for a given $\beta$ is characterized by $$\alpha = \sigma \cdot \sqrt{2 \cdot \log\left(\frac{2}{\beta}\right)}.$$

Figure 5:
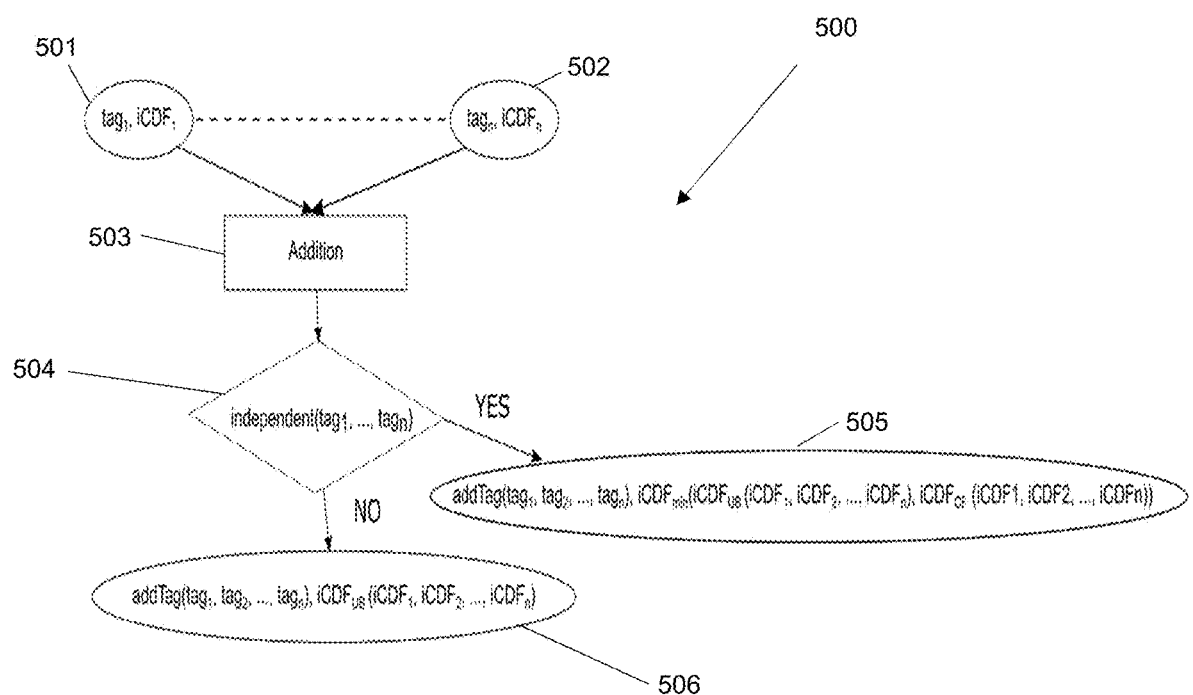
FIG. 5 is a schematic block diagram illustrating an exemplary method.

B. Aggregation: When the accuracy analysis finds an instruction to add noisy values, it proceeds to find corresponding provenance tags and iCDFs 501 . . . 502 for the operands—see FIG. 5 illustrating an aggregation method 500. The tag for the aggregated (noisy) value 503 is computed based on the tags of the operands as determined by a function addTag. This tag reflects—if possible—the parametrization of the distribution characterizing the total noise injected to the result of the aggregation. The analysis also uses the information of the operands' tags to select the concentration bound (i.e., union or Chernoff) which yields the narrowest confidence interval for a given confidence parameter $\beta$—sometimes union bound provides tighter estimations when aggregating few noisy values.

The accuracy analysis uses the information in the tags to (a) determine 504 that no operand can influence the value of another, i.e., they are independent, which is a check performed by a function independent, and (b) to determine if all the operands got injected with statistical noise coming from the same distribution but with possibly different parameters—a check that is also performed by such function. If one of the conditions (a) or (b) is not fulfilled 506, the analysis computes the iCDF of the aggregation by using the union bound with the iCDFs of the operands. On the other hand, if (a) and (b) are fulfilled 505, the analysis creates an iCDF which, given a confidence parameter $\beta$, compares and selects the narrowest confidence interval yielded by the union and Chernoff bounds.

A function $iCDF_{UB}$ calculates the iCDF of the aggregation using the union bound, which makes no assumption about the statistical noise injected in the operands. More specifically, function $iCDF_{UB}$ takes the iCDFs of the corresponding operands and returns an iCDF as follows.

$$iCDF_{UB}(iCDF_1, \ldots, iCDF_n)(\beta) = \sum_{j=1}^{n} iCDF_j\left(\frac{\beta}{n}\right)$$

In contrast, function $iCDF_{CF}$ calculates the iCDF of the aggregation using the Chernoff bound according to the chosen underlying DP mechanism. Finally, function $iCDF_{min}$ takes two iCDFs and generates an iCDF which, when given a confidence parameter $\beta$, chooses the narrowest confidence interval of the iCDFs given as arguments. More formally, we have the following definition:

$iCDF_{min}(iCDF_1, iCDF_2)(\beta) = \min\{iCDF_1(\beta), iCDF_2(\beta)\}$

Below, functions addTag, independent, and $iCDF_{CF}$ are instantiated for the Laplace and Gaussian DP mechanisms.

For a data analysis using the Laplace Mechanism,
addTag ($tag_1, \ldots, tag_n$)=$\emptyset$, which sets the tag of the result of the aggregation as empty. This reflects that the scale of the noise and distribution of the addition is unknown—adding two Laplace distributions do not yield a Laplace distribution.

Let define the inputs from FIG. 5 $tag_j$, $iCDF_j$, j=1, . . . , n; then we define independent($tag_1, \ldots, tag_n$)=($\forall$ j $\in$ $\{1, \ldots, n\} \cdot tag_j \neq \emptyset$) $\wedge$ ($\cap_{j=1, \ldots, n} P_j = \emptyset$)

where $tag_j = \{(L, s_j, P_j)\}$ for j $\in$ $\{1, \ldots, n\}$. This function evaluates to true (YES in FIG. 5) when none of the tags is empty and consists on a single element (as indicated above) and the identifiers of the operands are disjoint. In any other case, it returns false 506 (NO in FIG. 5).

Let define the inputs from FIG. 5 $tag_j$, $iCDF_j$, j=1, . . . , n; then we define $$iCDF_{CF}(iCDF_1, \ldots, iCDF_n)(\beta) = v \cdot \sqrt{8 \cdot \log\left(\frac{2}{\beta}\right)}$$

where $\text{tag}_j = \{(L, s_j, P_j)\}$ for $j \in \{1, \ldots, n\}$, $b_M = \max\{s_j\}_{j=1,\ldots,n}$, given a $\tau > 0$, and $v=$ $$\max\left\{\sqrt{\sum_{j=1}^{n} s_j^2}, b_M \cdot \sqrt{\log\left(\frac{2}{\beta}\right)}\right\} + \tau.$$

Any positive value of $\tau$ can be used in this formula, but the smaller, the better, e.g., $\tau = 0.00001$.

For a data analysis using the Gauss Mechanism, addTag($\text{tag}_1, \ldots, \text{tag}_n$) = $\{(G, \Sigma_{j=1}^{n} s_j, \cup_{j=1,\ldots,n} P_j)\}$, where $\text{tag}_j = \{(G, s_j, P_j)\}$ for $j \in \{1, \ldots, n\}$. In this case, the produced tag reflects the fact that the addition of statistical noise arising from Gaussian distributions results into statistical noise under a Gaussian distribution—note the label G in the resulting tag –, which variance is $\Sigma_{j=1}^{n} s_j$, i.e., the addition of the variance of the Gauss distributions associated to the noisy operands. Furthermore, the provenance of the noise consists of all the operands' identifiers, i.e., $\cup_{j=1,\ldots,n} P_j$, since all of them contributed to the noise injected into the result.

Let us define the inputs from FIG. 5 $\text{tag}_j$, $iCDF_j$, $j=1, \ldots, n$; then independent($\text{tag}_1, \ldots, \text{tag}_n$) = ($\forall j \in \{1, \ldots, n\} \cdot \text{tag}_j \neq \emptyset$) $\wedge$ ($\cap_{j=1,\ldots,n} P_j = \emptyset$) where $\text{tag}_j = \{(G, s_j, P_j)\}$ for $j \in \{1, \ldots, n\}$. This function evaluates 505 to true (YES in FIG. 5) when none of the tags is empty and consists on a single element (as indicated above) and the set of identifiers of the operands are disjoint. In any other case, it returns false (NO in FIG. 5).

Let us define the inputs from FIG. 5 $\text{tag}_j$, $iCDF_j$, $j=1, \ldots, n$; then $$iCDF_{CF}(iCDF_1, \ldots, iCDF_n)(\beta) = \sqrt{2 \cdot \sum_{j=1}^{n} s_j \cdot \log\left(\frac{1}{\beta}\right)},$$

where $\text{tag}_j = \{(G, s_j, P_j)\}$ for $j \in \{1, \ldots, n\}$. Observe that in this case, Chernoff bound does not use the iCDFs of the operands.

Figure 6:
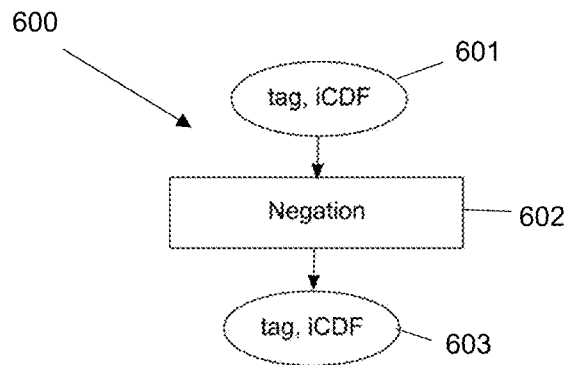
FIG. 6 is a schematic block diagram illustrating an exemplary method.

C. Negation: Negating a noisy value, i.e., multiplying it by $-1$, becomes useful when implementing subtractions of noisy data. If the given data analysis performs such operation, the accuracy analysis associates 601 the same tag and iCDF to the result as the input—see FIG. 6 illustrating a negation function 600. The reason for that is that multiplying a noisy value by $-1$ does not affect the size of the estimated confidence intervals for a given confidence parameters $\beta$, thus, after the negation 602, the analysis keeps the same iCDF associated to the input. Similarly, the tag associated to the negation of the input is the same as the input itself. The reason for that relies on the fact that distributions characterizing statistical noise in DP mechanisms involve both negative and positive noise (e.g., the Laplace and Gauss mechanisms). Therefore, the noise of the result is negated but drawn from the same distribution as the input—thus the same tag. The function returns 603 the negated tag and iCDF.

Figure 7:
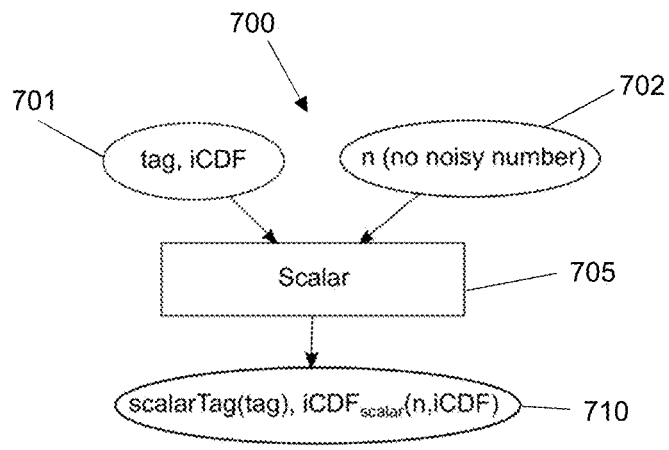
FIG. 7 is a schematic block diagram illustrating an exemplary method.

D. Scalar: This case deals with calculating the accuracy of noisy values 701 which get multiplied 705 by a non-noisy constant n 702—see FIG. 7 illustrating a scalar function 700.

The resulting tag 710 depends on the statistical noise distribution of the input. More specifically, there are three cases to consider:

scalarTag(tag)=$\emptyset$, where tag=$\emptyset$. This case triggers when it is unknown the distribution from where the noise was injected in the input noisy value. Thus, the resulting tag is also the empty set $\emptyset$.

scalarTag(tag)=$\emptyset$, where tag=$\{(L, s, P)\}$ and n$\neq$0. This case considers a noisy value generated by the Laplace mechanism. The resulting tag is $\emptyset$ indicating that the distribution which characterize the noise in the result (i.e., scaled value) is unknown—this arises from the fact that multiplying a constant value by a Laplace distribution is not necessarily a Laplace distribution.

scalarTag(tag)=$\{(G, n \cdot \sigma^2, P)\}$, where tag=$\{(G, \sigma^2, P)\}$ and n$\neq$0. This case considers a noisy value with statistical noise drawn from a Gaussian distribution. The resulting tag changes the variance of the distribution to indicate that the noise has been multiplied by the constant n.

The iCDF of the resulting noisy value simply scales the confidence interval by the absolute value of constant n:

$iCDF_{scalar}(n, iCDF)(\beta) = iCDF(\beta) \cdot |n|.$

Figure 8:
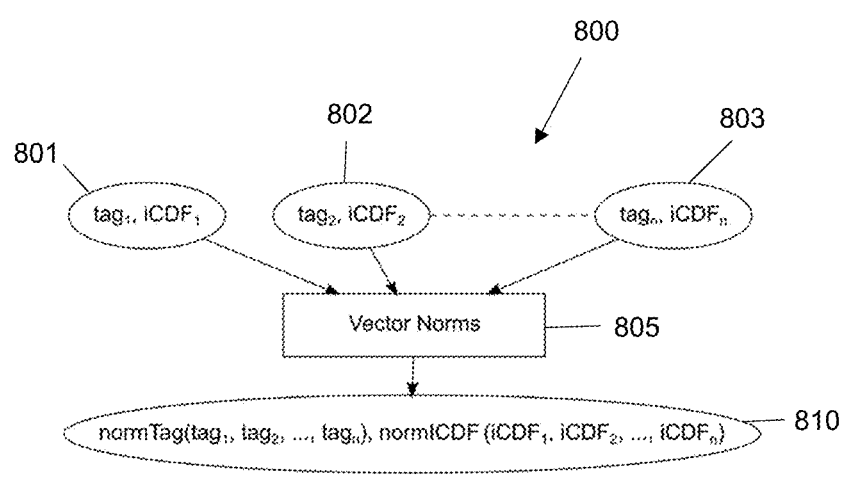
FIG. 8 is a schematic block diagram illustrating an exemplary method.

E. Norms: It becomes useful for data analyses to use norms (e.g., the standard $\ell_\infty, \ell_2, \ell_1$ norms) to aggregate the accuracy calculations of many released values 801, 802, . . . 803 into a single measure 810—a useful tool when dealing with vectors. When the accuracy analysis finds an instruction to compute a norm, it proceeds to find the corresponding provenance tags and iCDFs for the elements in the vector. Then, it creates the tag and iCDF for the vector as follows: (i) it determines the tag (provenance) of the vector as empty (see function normTag) and (ii) it calculates the iCDF for the vector based on the chosen norm and the iCDFs of the elements in the vector. In FIG. 8, the function normICDF performs 805 such calculation.

Below, the same definitions for functions normTag and normICDF work for both the Laplace and Gaussian mechanisms.

normTag($\text{tag}_1, \ldots, \text{tag}_n$)=$\emptyset$, which indicates that the noise found in the norm calculation cannot be characterized by a distribution.

Let us define the inputs from FIG. 5 $\text{tag}_j$, $iCDF_j$, $j=1, \ldots, n$

The calculation of the iCDF for the $\ell_\infty$-norm (L infinite):

$$normICDF(iCDF_1, iCDF_2, \ldots, iCDF_n)(\beta) = \max_{j=1,\ldots,n}\left\{iCDF_j\left(\frac{\beta}{n}\right)\right\}$$

The calculation of the iCDF for the $\ell_2$-norm (L1):

$$normICDF(iCDF_1, iCDF_2, \ldots, iCDF_n)(\beta) = \sqrt{\sum_{j=1}^{n} iCDF_j\left(\frac{\beta}{n}\right)^2}$$

The calculation of the iCDF for the $\ell_1$-norm (L2):

$$normICDF(iCDF_1, iCDF_2, \ldots, iCDF_n)(\beta) = \sum_{j=1}^{n}\left|iCDF_j\left(\frac{\beta}{n}\right)\right|$$

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method for analyzing the accuracy of a data analysis performed by a differential privacy (DP) mechanism, the method performed by an electronic device, comprising:
    receiving, by the electronic device, information about the data analysis, the information about the data analysis comprising noisy values generated by the DP mechanism, information about the DP mechanism, instructions specifying aggregation operations performed during the data analysis, and a scenario parameter set related to the data analysis, wherein the scenario parameter set includes:
        a first DP parameter set comprising ($\in,\delta$) and a confidence parameter for accuracy calculations, or
        a first confidence interval and a confidence parameter;
    performing, by the electronic device, taint analysis to generate and store provenance tags for the noisy values, wherein each of the provenance tags comprises:
        an identifier of a statistical noise distribution,
        a parametrization of the statistical noise distribution, and
        an identifier denoting a statistical dependency between a respective noisy value and one or more of the other noisy values, if the statistical dependency exists;
    determining statistical independence of the noisy values by analyzing the provenance tags;
    identifying, by the electronic device and using the instructions specifying the aggregation operations, aggregated noisy values generated during the data analysis by performing respective aggregation operations on respective input noisy values of the noisy values, wherein the aggregation operations comprise at least one of summation, scalar multiplication, negation, or vector norm calculation;
    updating, by the electronic device, provenance tags for the aggregated noisy values, wherein the updated provenance tags are computed based on the respective aggregation operations and provenance tags for the respective input noisy values;
    estimating, by the electronic device, accuracy of the data analysis as a second confidence interval, wherein the second confidence interval is derived from one or more concentration bounds selected based on the updated provenance tags;
    generating, by the electronic device, a scenario response based on the estimated accuracy and the scenario parameter set, wherein the scenario response comprises:
        the second confidence interval when the scenario parameter set lacks the first confidence interval, or
        a second DP parameter set to achieve a specified accuracy; and
    outputting the scenario response; and
    providing, by the electronic device and using the scenario response, the second DP parameter set as input to the DP mechanism, wherein the DP mechanism uses the second DP parameter set to perform a second data analysis resulting in output with the specified accuracy.

2. The method of claim 1, wherein determining the statistical independence of the noisy values comprising:
    for a respective noisy value of the noisy values:
        inspecting a respective provenance tag for the respective noisy value; and
        in response to determining that the respective provenance tag does not indicate statistical dependencies, determining that the respective noisy value has statistical independence.

3. The method of claim 1, wherein updating the provenance tags for the aggregated noisy values comprises:
    for a respective aggregated noisy value of the aggregated noisy values:
        calculating an updated provenance tag based on provenance tags of respective input noisy values and a respective aggregation operation;
        identifying, using the provenance tags of the respective input noisy values, whether the respective input noisy values are statistically independent; and
        if statistical dependencies are identified from any of the provenance tags of the respective input noisy values, incorporating the statistical dependencies into the updated provenance tag.

4. The method of claim 1, wherein the DP mechanism comprises:
    a Laplace mechanism or
    a Gaussian mechanism.

5. The method of claim 1, wherein the concentration bounds comprise at least one of:
    a union bound; or
    a Chernoff bound.

6. The method of claim 5, wherein the union bound is selected when the noisy values are statistically dependent and the Chernoff bound is selected when the noisy values are statistically independent.

7. The method of claim 1, wherein estimating the accuracy of the data analysis as the second confidence interval comprises:
    using inverse cumulative distribution functions (iCDFs) to calculate confidence intervals for the aggregated noisy values; and
    deriving the second confidence interval for the data analysis by applying one or more concentration bounds to the confidence intervals calculated using the iCDFs.

8. The method of claim 1, wherein the information about the data analysis is received from a remote device via a digital communications network, and the scenario response is provided via the digital communications network.

9. The method of claim 1, wherein the vector norm calculation comprises an $L_1$-Norm, an $L_1$-Norm, or an $L_\infty$-Norm.

10. The method of claim 1, wherein performing the second data analysis comprises:
    injecting additional noise into the noisy values based on the scenario response; and
    providing the result of injecting the additional noise into the noisy values.

11. The method of claim 1, wherein the information about the data analysis further comprises: a structure of a data set, the data set, or a query to run.

12. An electronic device for analyzing the accuracy of a data analysis performed by a differential privacy (DP) mechanism, the electronic device comprising:
  one or more processors; and
  a memory storing instructions that, when executed by the one or more processors, cause the electronic device to perform the method of claim 1.

13. A non-transitory computer-readable storage medium storing instructions that, when executed by one or more processors, cause the processors to perform the method of claim 1.

* * * * *